Feb. 8, 1955 G. C. BERGER ET AL 2,701,595
STALK AND STRAW DISINTEGRATING AND SCATTERING DEVICE
Filed Aug. 29, 1949 2 Sheets-Sheet 1
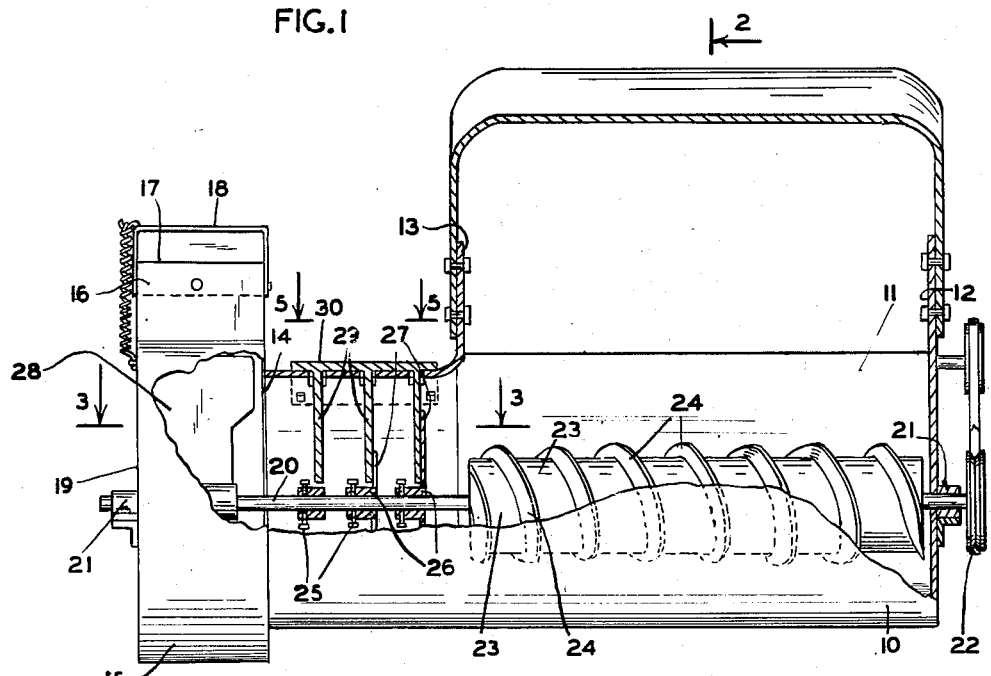
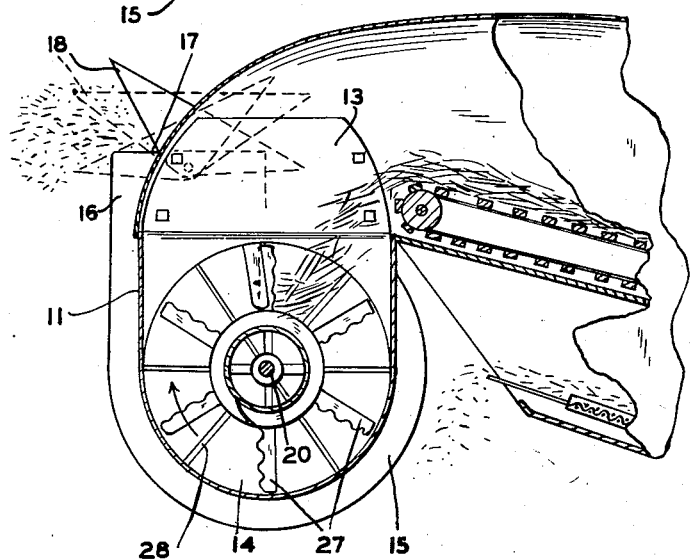
INVENTORS
GEORGE C BERGER
ALBIN O MYROLD
BY
*Williamson & Williamson*
ATTORNEYS

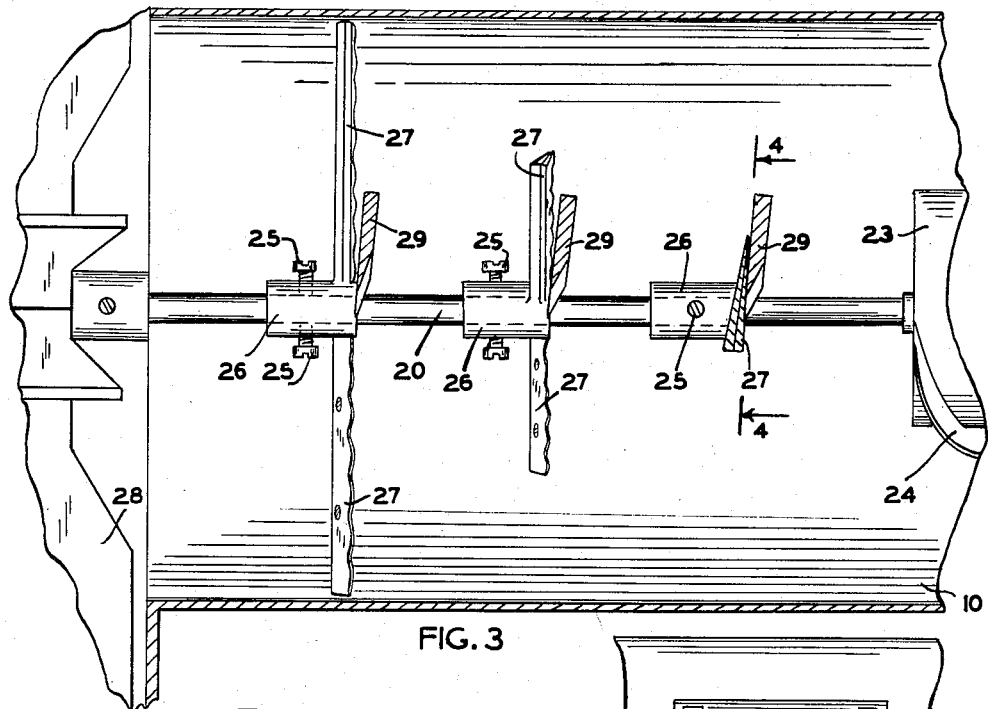
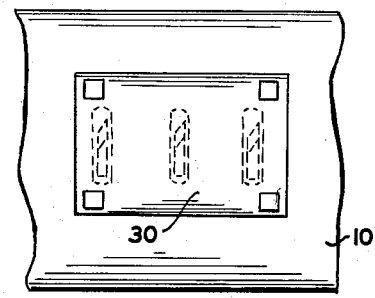
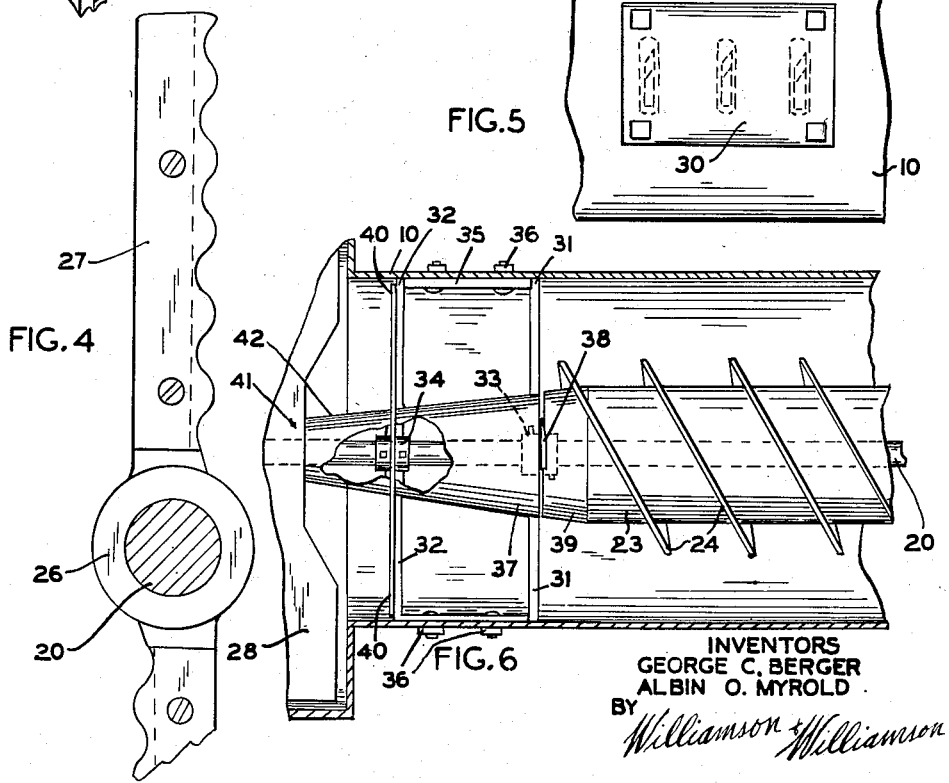

United States Patent Office 2,701,595
Patented Feb. 8, 1955

2,701,595

STALK AND STRAW DISINTEGRATING AND SCATTERING DEVICE

George C. Berger, Erskine, and Albin O. Myrold, Crookston, Minn.

Application August 29, 1949, Serial No. 112,926

4 Claims. (Cl. 146—107)

This invention relates to combines and other harvesting machines which usually remove and separate the grain kernels, fruit or natural food products from the stalks and straw and which normally discharge the stalks from the delivery end of the machine. It has particular relation to the disintegration and wide scattering of the disintegrated particles of stalks and straw continuously throughout the operation of the machine.

It is an object of our invention to provide an improved stalk and straw disintegrating and scattering device adapted for use as an attachment or as standard equipment in various harvesting machines such as grain combines, wherein provision is inherently made for direction and discharge of stalks and/or straw after preliminary handling of crops grown by broadcast or row planting.

Another object is the provision of a stalk and straw disintegrating and scattering machine or attachment adapted to be readily applied to the straw or stalk discharge of conventional combines and the like and adapted in co-operation with the stalk directing facilities of the combine, to cause the stalks and straw to be very finely disintegrated and to thereafter be positively drawn by a rapidly revolving rotor from the area of the disintegrating operation into the path of the rotating members of the rotor itself whereby it is agitated and centrifugally flung and dispersed over substantial area to the side and rear of the combine or other harvester.

More specifically, it is an object to provide a device or mechanism of the class described wherein two sets of cutter elements work in close co-operation with an auger type conveyor to produce a vey efficient grinding and disintegration of the stalks and straw into small particles and to further co-operate with additional mechanism for very efficiently and widely dispersing and scattering the disintegrated stalks and straw.

A further object is the provision of a device and mechanism of the class described which includes in close co-operation with two sets of cutter elements, one fixed and one rotary, a rapidly rotating auger type conveyor for conveying and a centrifugal flinging distributor producing fan action and wide dispersion of the particles produced.

Another object of our invention is to provide a stalk and straw disintegrating and scattering machine or attachment adapted to be readily applied to the straw or stalk discharge of conventional combines and the like and adapted in close co-operation with the stalk directing facilities of the combine, to cause the stalks and straw to be conveyed laterally in a moderate and uniform flow to cutter elements disposed outside the usual housing of the combine, then to be very finely disintegrated and to be thereafter agitated and centrifugally flung and dispersed over substantial area to the side and rear of the combine or other harvester.

A still further object of our invention is to provide a stalk and straw disintegrating and scattering machine or attachment adapted to be readily applied to the straw or stalk discharge of conventional combines and the like and adapted, in close co-operation with the stalk directing facilities of the combine, to cause the stalks and straws to be presented to cutting elements at such an angle as to insure that all of such stalks or straw will be finely disintegrated before it is agitated and centrifugally flung and dispersed over substantial area to the rear and side of the combine or harvester.

Another object is the provision of a stalk and straw disintegrating and scattering machine or attachment adapted to be readily applied to straw or stalk discharge of conventional combines and the like and adapted to submit the stalks and straw in a moderate and regular flow to the cutting elements so as to prevent plugging of the machine and adapted to cause the stalk and straw to be very finely disintegrated and to be thereafter agitated and centrifugally flung and dispersed over substantial area to the side and rear of the combine or other harvester.

Still another object of our invention is to provide a stalk and straw disintegrating and scattering machine or attachment adapted to be readily applied to the stalk or straw discharge of conventional combines and the like which will accomplish its purpose without any winding or wrapping of the stalks or straws about the operating parts of the machine or attachment with a consequent loss of power and danger of plugging.

Another object is the provision of a device and mechanism of the class described which includes in close co-operation with two sets of cutter elements, one fixed and one rotary, a rapidly rotating auger type conveyor, a centrifugal flinging distributor producing fan action and wide dispersion of the particles produced as well as a sucking action on the stalks and straw as they progress through the cutter elements, and a means for positively preventing winding and wrapping of the stalks and straw on the axes of rotation of the cutter elements and the distributor.

These and other objects and advantages of our invention will more fully appear from the following description made in connection with the accompanying drawings, wherein like reference characters refer to similar parts throughout the several views and, in which:

Fig. 1 is a front perspective view with a section cut away to show the crucial operating elements;

Fig. 2 is a cross sectional view along line 2—2 of Fig. 1 showing the auger and rear end of the combine and in the background the cutting elements and rotor in operation.

Fig. 3 is a fragmentary top plan view on an enlarged scale along line 3—3 of Fig. 1 showing the staggered position of the knives and the rotor.

Fig. 4 is an enlarged section along line 4—4 of Fig. 3 showing the serrated edges of the knives and their position relative to each other.

Fig. 5 is a fragmentary top plan view on an enlarged scale of the cutting bar base along line 5—5 of Fig. 1.

Fig. 6 is a horizontal sectional view of another form of the invention with a portion cut away to show the method of bearing support.

Referring now to Figs. 1–5 which show one embodiment of our stalk and straw disintegrating mechanism, Fig. 1 is a view of our invention attached to the rear and straw discharge portion of a conventional type of combine, and is viewed from the rear. It is a unit which is well adapted as an attachment to various types of conventional combines and other harvesting machines and which is equally applicable as standard construction in the manufacture of harvesters. As shown, our machine or unit is supported by and mounted in an essentially cylindrical frame 10 disposed transversely to the discharge flow of the combine. A portion of said frame corresponding in length to the width of the discharge end of the combine has approximately one half its upper section cut away and its sides 11 built up vertically so as to form what is essentially a trough to receive the stalks and straw directed into it by the inherent structure of the combine. One end of said cylinder is extended upwardly in a flange 12 for the purpose of providing a means of securing the unit to one side of the combine. At the other end of the trough a portion of the top of the cylinder 10 is curved upwardly to form a vertical flange 13 which provides a means of securing the unit to the other side of the combine. One end of said cylindrical frame 10 is open, said end being adjacent to, of equal diameter, and registering with edges of the opening in the end 14 of the rotor housing 15 which consists of a cylindrical section of considerably larger diameter than said cylindrical frame 10. Near or at the top of the rotor housing 15 is a discharge opening to which is connected one end of a rigid upright conduit 16 which is made of metal or other suitable material. The other end of this conduit 16 has an opening 17 through which the disintegrated stalks and straw are discharged. A shiftable deflector hood 18 is secured to the conduit 16 near and over the discharge opening 17 so as to catch and direct the discharge stream to one side and to the rear of the combine and disperse it over a substantially wide area. The other end 19 of the rotor housing 15 is closed.

Extending horizontally and transversely relative to the discharge stream of the combine and through the center of the cylindrical frame 10 and rotor housing 15 is a cylindrical shaft 20 mounted at its ends in bearings 21 on the outside of the rotor housing 15 and the closed end of the cylindrical frame 10. Mounted on the shaft 20 outside the closed end of the cylindrical frame 10 is a mechanism 22 for receiving a source of power for rotating said shaft at a relatively high rate of speed. Mounted on shaft 20 within the cylindrical frame 10 and extending across the full width of the discharge opening of the combine and the receiving opening of the unit is a rotatable cylinder 23 having a diameter approximately one-half that of the cylindrical frame 10. This cylinder 23 is equipped with a means of lateral conveyance 24 such as that shown in Fig. 1 which comprises what is commonly known as an auger.

Fixedly mounted on shaft 20 within the closed portion of the cylindrical frame 10 by means of set screws 25 or other suitable means are spaced bevelled knife holders 26 arranged approximately equidistant and in staggered relation. The knives 27 are also bevelled and are rigidly fixed on the knife holders 26 by any suitable means so that the cutting edges of said knives are facing the direction of rotation of shaft 20, and so that the bevelled edges are complementary, forming one bevelled surface.

Within the rotor housing 15 and fixedly mounted on shaft 20 is a conventional centrifugal type rotor 28.

Extending through slots cut in the closed portion of the cylindrical frame 10 is a set of fixed bevelled cutter bars 29 so arranged as to act in close co-operation with the knives 27 which are sufficiently less in length than the radius of the cylindrical frame 10 to enable them to rotate freely. These cutter bars are rigidly fixed to a plate 30 which is concentrically shaped relative to the exterior surface of the cylindrical frame 10 and which is rigidly and removably secured by any suitable means to the cylinder frame 10.

Fig. 6 shows a modified form of our invention. In this form which has been found preferable for harvesting crops which have tough stalks, straw and fibers (such as flax, for example) two spaced fixed cutter bars 31 and 32 extend across the full diameter of the cylindrical frame 10. These cutters bars are pierced medially by the shaft 20 and fastened thereto by means of two bearings 33 and 34 and secured by bolts or other suitable means at their ends to the wall of the cylindrical frame. It has been found that a cross bar 35 welded or secured in some other suitable manner between the corresponding ends of the fixed cutter bars 31 and 32 and fastened to the wall of the cylindrical frame 10 by bolts 36 or other suitable means holds these cutter bars securely in place. Secured in some suitable manner, preferably by welding, between the two bars 31 and 32 is a drum 37 of metal or other suitable material.

Mounted on shaft 20 and revolving in close proximity to and just ahead of its co-operating cutter bar 31 relative to the direction of flow of stalks and straw, is one set of cutter knives 38. The portion 39 of the rotatable body 23 with its means of conveyance 24 thereon which is nearest cutter bar 31 is frusto-conical in shape, tapering toward the cutter bar. The smaller end of the frusto-conical portion 39 is fitted snugly to the set of knives 38 to prevent stalks and straw from winding and wrapping on shaft 20. As shown, the drum 37 is also frusto-conical and of such diameter and degree of tapering as to amount to an extension of the frusto-conical portion 39 of the rotatable body 23 as if the section now occupied by the cutter bar 31 and knife 38 had been removed. Mounted on shaft 20 just behind and co-operating with cutter bar 32 is a second set of rapidly revolving knives 40. These knives 38 and 40 are similar in structure to knives 27 shown in Fig. 2.

Welded to the central portion 41 of the rotor 28 and extending to the set of cutter knives 40 is another frusto-conical drum 42 of such diameter and degree of tapering as to amount to a still further extension of the frusto-conical portion 39 of the rotatable body 23.

*Operation*

In operation the unit is fastened to the discharge end of the combine or to the harvester in such a position so as to receive the discharge stream into the open portion of the cylinder frame 10. The straw and stalks as they are discharged from the combine or other harvester are directed rearwardly and downwardly by the combine housing because of its inherent structure. The straw is received in the opening of the cylindrical frame 10 at varying rates and in varying sizes, sometimes reaching it in large clumps. Because of the downward and rearward direction of the straw it is flung upon the rotating cylinder 23 and the means of conveyance 24 mounted thereon. The cylindrical body 23 and the means of conveyance 24 thereon, the knives 27, and the rotor 28 are all rotated at a high rate of speed (for example, between 800 and 1600 R. P. M.) as the result of the application of a rotary source of power upon the mechanism 22 which is provided for that purpose. The cylindrical body 23 and the means of conveyance 24 thereon, a combination commonly known as an auger, carries the straw and stalks ejected through the discharge end of the combine laterally and transversely, submitting it to the cutter elements in a moderate, uniform and regular flow. This is made possible because of the combined size of the cylinder 23 and the means of conveyance 24 thereon relative to the diameter of the cylindrical frame 10. The diameter of this auger approximates one-half the diameter of the cylindrical frame 10. The size of the cylindrical frame 10 relative to the combined size of the cylindrical body 23 and the means of conveyance thereon 24 and the orientation of the cylindrical body 23 plus the lateral conveyance of the straw caused by the means of conveyance 24 insures that the straw and stalks will be submitted to the cutter elements in a position angular to the cutting arc of the knives. This is an improvement over previously devised means of submitting straw and stalks to the cutting elements since it insures that the stalks and straw will be cut off cleanly and will not slide past the cutting elements when in a position parallel to the cutting elements, thereby avoiding being severed. It also insures that the rotor will not be plugged as the result of having large clumps of only partially disintegrated straw and stalks being flung into it.

The straw and stalks are fed into the knives by the auger near the axis of rotation of the knives. This insures a maximum of power being exerted by the cutting elements. As the straw is fed by the auger into the rapidly rotating knives, it encounters a scissors-like cutting action which is the result of the arrangement of the cutter bars 29 and the knives 27. As the knives 27 rotate and the straw is fed in near their axis of rotation, the knives catch the straw and carry it around until they are in position to cooperate with the cutter bars 29. It can readily be seen that the portion of the knife to first come in close proximity to the cutter bar will be that nearest the axis of rotation, thereby providing a scissors-like cutting action on the straw and stalks. The serrated edges of the knives 27 make them even more effective as cutting elements and increases the scissor-like effect in the cutting action. The knives are staggered in relation to each other upon the shaft 20, thereby insuring a uniform resistance to the rotation of the shaft 20, and consequent avoidance of the plugging of the unit. The relative position of the cutter bars 29 and the knives 27 also provide a sharpening effect on the knives when in operation. The cutter bars 29 are preferably but not necessarily located ahead of the knives with relation to the flow of the stream of straw and stalks. The effect of the bevelled edge of the knives 27 which complement the bevelled side of the knife holders 26 is to fling the straw, after it has been severed by the scissor-like action between the cutting bar 29 and the knife 27, laterally into the next knife. In addition to the lateral conveyance of the straw and stalks resulting from the bevelled faces of the knives, the disintegrated straw and stalks are drawn toward the rotor 28 by a suction effect resulting from the rapid rotation of the rotor itself. This effect is the result of a reduced air pressure extending throughout the area through which the knives rotate and into the area in which the auger operates and is caused by the rapid revolving of the rotor 28. The rapidly rotating rotor catches the finely disintegrated mass of straw and stalks as it leaves the knives 27 and enters the opening in the side of the rotor casing 15 and flings it out of the opening 17 of the conduit 16. As the stalks and straw leave this opening they strike the deflecting hood 18 which is used to deflect and disperse the finely disintegrated straw over a substantial area to the side and rear of the combine. Any suitable means of lateral conveyance may be used instead of the auger shown in Fig. 1. It has been found, however, that the auger type of conveyance is uniquely adapted for the purpose desired in this mechanism, since it insures a moderate, uniform and regular flow of stalks and straw into the path of the rotating knives.

The lateral position of the cutter knives relative to the path of the discharge stream of the combine prevents the dropping of the straw and stalks as they are ejected through the discharge opening in lumps into the path of the rotating cutting knives. In previous devices designed to accomplish what this mechanism accomplishes this has been one of the biggest difficulties experienced in operating such a unit, since a combine oftentimes throws straw and stalks through its discharge opening in large tough clumps. The cooperating action of the auger and the lateral position of the knives outside the housing of the combine provides a means of solving this difficulty, since in this mechanism the stream of stalks and straw is submitted into the path of the rotating knives at an angle and in a moderate, regular, and uniform stream.

It should be noted that one of the features of this unit is that the knives pick up the straw on their cutting edges on their way around and cut the straw off cleanly each time as they pass the cutter bar.

It should also be noted that one of the advantages of this mechanism is that all of the principal operating elements can be mounted on one shaft 20, with the result that the entire unit is much simpler and easier to manufacture. The knives, the auger and the rotor are all removable through the mere loosening of set screws and the withdrawal of the shaft 20. It has been found that although it is advisable to secure the rotor and the auger by means of set screws cooperating with a slot in the shaft 20, it is more practical to have the knives fastened with screws not set in slots but merely being applied to the round surface of the shaft itself. The advantage of this arrangement is that the knives will be permitted to yield in the event metal or a similar substance has been inadvertently permitted to pass through the combine. Of course, the knives would then have to be reset but the danger resulting would be minimized.

Fig. 6 shows an embodiment of our invention designed to prevent winding and wrapping of stalks, straw and fibers about shaft 20 when harvesting fibrous crops such as flax, for example. The purpose of each of the frusto-conical drums 37, 39 and 42 is to prevent winding and wrapping of these fibrous materials around shaft 20 and the various bearings and set screws needed to hold the knives and cutter bars in place. It has been found that an embodiment of our invention such as is shown in Fig. 6 will operate efficiently in disintegrating and scattering the stalks, straw and fibers of even the toughest plants and crops. Since the frusto-conical portion 39 of the rotatable body 23 is fitted snugly to the knife 38, it is impossible for any fibrous material to come in contact with the set screws holding the knife. Also, since the drum 37 is welded between the two cutter bars 31 and 32 there is no opportunity for fibrous material to come in contact with the section of shaft 20 which extends between these two cutter bars. The drum 42 positively prevents fibrous material from coming in contact with shaft 20 or the set screws necessary to hold knife 40 in place. The complementary frusto-conical shapes of the drum 39, 37 and 42 assist in preventing fibrous material from working into the drums and winding and wrapping about shaft 20. Thus it can be readily seen that this device will operate in even the toughest of fibrous plants without winding and wrapping about shaft 20 and the consequent loss of power and danger of plugging.

It should be noted the bearings 33 and 34 aid in keeping the shaft 20 rigid and at the same time insure that the cutter bars 31 and 32 are at all times parallel to the plane in which the knives 38 and 40 rotate.

It will, of course, be understood that various changes may be made in the form, details, arrangement and proportions of the various parts without departing from the scope of our invention.

What we claim is:

1. A straw and stalk disintegrating and scattering device for attachment to the discharge opening of a combine having in combination an elongated shaft, structure for rotatably mounting said shaft in substantially horizontal position transversely across the discharge opening of a combine, a set of axially arranged rotary cutter elements mounted on said shaft for rotation therewith, a second and cooperating set of fixed cutter elements operatively mounted on the structure and working in close relationship with said rotary cutter elements, a rotor body mounted on said shaft across the discharge opening of the combine in position to receive the stalks and straw therefrom and having means of positive conveyance thereon and having a discharge end in close proximity to some of said rotary cutter elements, a fan housing disposed on the side of said cutter elements remote from the rotor body and receiving straw and stalks therefrom, a fan mounted in said housing on said shaft for revolution therewith, said housing having a discharge opening, and means for positively preventing winding or wrapping of straw and stalks about said shaft adjacent to said cutter elements and said fan, said means being comprised of a cone surrounding said shaft and having its smaller end in close proximity to said fan and its larger end in close proximity to said rotor.

2. A straw and stalk material disintegrating and scattering device for attachment to the discharge opening of a combine, said device comprising in combination a rotor body, structure adapted for mounting on the combine in cooperative relation with the discharge opening for receiving straw and stalk material discharged rearwardly and downwardly from said opening, the rotor body including means for effecting positive conveyance of the material through the structure in one direction, means for mounting the rotor body on said structure for rotation on an axis extending transversely of said discharge opening, cutter elements mounted on said structure adjacent to one end of said rotor body, other cutter elements carried by the second means for rotation on said axis in cooperation with the first named elements, said cooperating cutter elements being positioned in relation to said one end of the rotor body to receive straw and stalk material conveyed in said one direction from the rotor body, rotary discharge means operatively coupled with the second named means to turn on said axis and disposed on the side of the cutter elements remote from the rotor body, means for turning the rotor body, said other cutter elements and said rotary discharge means together as a unit on said axis, and means for positively preventing winding or wrapping of said straw and stalk material about the axis of said other cutter elements, said last stated means comprising a frusto-conically shaped drum arranged around said shaft with its smaller end adjacent to said discharge means, and with its larger end adjacent to said rotor body.

3. A straw and stalk disintegrator for attachment to a downwardly directed material outlet of a combine, said disintegrator comprising a substantially cylindrical housing of a length greater than the width of the combine material outlet to which it is to be attached, said housing having a top longitudinal inlet opening corresponding in length to the width of said outlet, means extending upwardly from the housing at each end of said inlet opening for attaching the housing in position to receive material through said inlet opening from the combine outlet, said housing being open at one end, a fan housing carried on said open end of the cylindrical housing and having an inlet aligned with said open end and an outlet, a rotary shaft extending axially through the cylindrical housing and into the fan housing, an auger carried by the shaft below the cylindrical housing inlet and extending the entire length of the cylindrical housing inlet and adapted to move material toward the fan housing inlet, fan blades supported in the fan housing for coaxial rotation with said shaft, a plurality of cutters secured to said shaft between the auger and the fan housing opening to rotate with the shaft in planes perpendicular to the axis of the shaft, a plurality of fixed cutter bars within the cylindrical housing and attached thereto, each of the cutter bars extending radially of the cylindrical housing and being positioned for close shearing cooperation with one of said cutters, and means for rotating the shaft and the fan blades, said cylinder terminating at the end adjacent to the cutters in a frusto-conical extension, a frusto-conical drum surrounding the shaft between the cutters and another frusto-conical drum surrounding the shaft between the fan blades and the cutters adjacent thereto, and said cylinder terminal extension and said drums being in an assembled relation to form a substantially continuous tapering structure between the cylinder and the fan blades.

4. A straw and stalk disintegrator for attachment to a downwardly directed material outlet of a combine, said disintegrator comprising a substantially cylindrical housing of a length greater than the width of the combine material outlet to which it is to be attached, said housing having a top longitudinal inlet opening corresponding in length to the width of said outlet, means extending upwardly from the housing at each end of said inlet opening for attaching the housing in position to receive material through said inlet opening from the combine outlet, said housing being open at one end, a fan housing carried on said open end of the cylindrical housing and having an inlet aligned with said open end and an outlet, a rotary shaft extending axially through the cylindrical housing and into the fan housing, an auger carried by the shaft below the cylindrical housing inlet and extending the entire length of the cylindrical housing inlet and adapted to move material toward the fan housing inlet, fan blades supported in the fan housing for coaxial rotation with said shaft, a plurality of cutters secured to said shaft between the auger and the fan housing opening to rotate with the shaft in planes perpendicular to the axis of the shaft, a plurality of fixed cutter bars within the cylindrical housing and attached thereto, each of the cutter bars extending radially of the cylindrical housing and being positioned for close shearing cooperation with one of said cutters, means for rotating the shaft and the fan blades, said cutter bars extending across the width of the cylindrical housing in close proximity to the shaft, each of said cutter bars having its ends secured to the housing wall, said cylinder terminating at the end adjacent to the cutters in a frusto-conical extension, a frusto-conical drum surrounding the shaft between the cutter bars and another frusto-conical drum surrounding the shaft between the fan blades and the cutter bar adjacent thereto, and said cylinder terminal extension and said drums being in assembled relation to form a substantially continuous tapering structure between the cylinder and the fan blades.

References Cited in the file of this patent

UNITED STATES PATENTS

| | | |
|---|---|---|
| 1,464,621 | Kemp | Aug. 14, 1923 |
| 1,524,887 | Ronning et al. | Feb. 3, 1925 |
| 1,697,925 | McKay | Jan. 8, 1929 |
| 1,862,396 | Gray et al. | June 7, 1932 |
| 1,987,656 | Althouse et al. | Jan. 15, 1935 |
| 2,239,486 | Edwards | Apr. 22, 1941 |
| 2,280,677 | Wagner et al. | Apr. 21, 1942 |
| 2,416,043 | Bucher-Guyer | Feb. 18, 1947 |
| 2,440,285 | Lykken et al. | Aug. 27, 1948 |
| 2,493,918 | Hill | Jan. 10, 1950 |
| 2,496,493 | Raney | Feb. 7, 1950 |

FOREIGN PATENTS

| | | |
|---|---|---|
| 509,663 | Germany | Oct. 11, 1930 |
| 577,081 | Germany | May 24, 1933 |
| 708,098 | France | July 20, 1931 |